United States Patent
Parish et al.

(10) Patent No.: US 8,689,095 B2
(45) Date of Patent: Apr. 1, 2014

(54) GRID PRESENTATION IN WEB-BASED SPREADSHEET SERVICES

(75) Inventors: Dan Parish, Kirkland, WA (US); Anthony Valey, Kirkland, WA (US); Ira Levin, Redmond, WA (US); Justin Rockwood, Kirkland, WA (US); Shahar Prish, Redmond, WA (US); Amar Grewal, Redmond, WA (US); Liviu Asnash, Bellevue, WA (US); Amir Avraham, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 589 days.

(21) Appl. No.: 12/368,146

(22) Filed: Feb. 9, 2009

(65) Prior Publication Data
US 2010/0205520 A1    Aug. 12, 2010

(51) Int. Cl.
*G06F 17/28* (2006.01)
*G06F 15/16* (2006.01)

(52) U.S. Cl.
USPC ........... 715/212; 715/255; 715/272; 715/784; 709/203; 709/217

(58) Field of Classification Search
USPC ......... 715/212, 784, 204, 226, 234, 243, 255, 715/272, 273, 274, 700, 760, 785, 786, 715/830; 709/201, 202, 203, 216, 217, 219
See application file for complete search history.

(56) References Cited

U.S. PATENT DOCUMENTS

| | | | |
|---|---|---|---|
| 6,518,984 B1 * | 2/2003 | Maeckel et al. | 715/786 |
| 6,580,436 B1 * | 6/2003 | Hishida et al. | 345/684 |
| 6,988,098 B2 | 1/2006 | Sonkin et al. | |
| 7,237,186 B2 | 6/2007 | Androski et al. | |
| 7,441,207 B2 | 10/2008 | Filner et al. | |
| 7,667,719 B2 * | 2/2010 | Goodwin et al. | 345/684 |
| 2002/0087519 A1 * | 7/2002 | Gehman et al. | 707/3 |
| 2006/0015804 A1 * | 1/2006 | Barton et al. | 715/503 |
| 2006/0020538 A1 | 1/2006 | Ram et al. | |
| 2006/0136808 A1 * | 6/2006 | Chirilov et al. | 715/503 |
| 2007/0046698 A1 * | 3/2007 | Nam et al. | 345/660 |
| 2007/0220013 A1 * | 9/2007 | Rabines et al. | 707/10 |
| 2007/0236508 A1 | 10/2007 | Lawler et al. | |
| 2008/0079972 A1 * | 4/2008 | Goodwin et al. | 358/1.12 |
| 2008/0270886 A1 | 10/2008 | Gossweiler et al. | |
| 2009/0043865 A1 * | 2/2009 | Dumitru et al. | 709/217 |
| 2009/0106687 A1 * | 4/2009 | De Souza Sana et al. | 715/784 |
| 2010/0211862 A1 * | 8/2010 | Parish et al. | 715/212 |

OTHER PUBLICATIONS

Greg Harvey, "Excel 2007 for Dummies," p. 57 (Wiley Publishing 2007).*

(Continued)

*Primary Examiner* — Maikhanh Nguyen
(74) *Attorney, Agent, or Firm* — Brian Haslam; Jim Ross; Micky Minhas

(57) ABSTRACT

Users are enabled to navigate a spreadsheet document presented by a web service in a similar fashion to a locally executed spreadsheet application by retrieving blocks of grid data asynchronously in order to display or refresh the area(s) of the spreadsheet currently being viewed by the user as the user navigates the spreadsheet grid or dynamic updates occur. The blocks are laid out in the browser's user interface to fill the user's viewport as well as a predefined buffer around the edge of the viewport. As such, when the user scrolls or updates occur, data associated with blocks are added, updated, or removed in the browser as required to fill the user's viewport.

19 Claims, 8 Drawing Sheets

(56) References Cited

OTHER PUBLICATIONS

"Features: Nitobi Grid V3", Retrieved at<<http://www.nitobi.com/products/grid/features/>>, Dec. 2, 2008, pp. 4.

"Telerik RadChart for Asp.Net Ajax", Retrieved at<<http://www.asp.net/community/control-gallery/Item.aspx?i=804>>, Dec. 2, 2008, pp. 3.

Tse Oliver, "Smart Scrolling with Bindows", Retrieved at<<http://skypoetsworld.blogspot.com/2007/01/smart-scrolling-with-bindows.html>>, Jan. 11, 2007, pp. 4.

"A Lightweight AJAX.NET-Enabled Grid Control", Retrieved at<<http://www.ajaxlines.com/ajax/stuff/article/a_lightweight_ajaxnetenabled_grid_control.php>>, Dec. 2, 2008, pp. 6.

* cited by examiner

GRID PRESENTATION IN WEB-BASED SPREADSHEET SERVICES

BACKGROUND

Web services for widespread user applications such as word processing, presentation, calendaring, and spreadsheets are becoming increasingly common. Users no longer need to deal with disadvantages of locally installed and executed applications such as having to update or reinstall the application each time an aspect of the application of the computing device changes, being tied to a single machine for processing their documents, and similar challenges.

User experience with web service applications—usually accessed through a browser's user interface—is typically somewhat different from the local application experience. Some of the reasons for this disparity include display capabilities of browsers differing from capabilities of actual application user interfaces, data having to be retrieved over network(s) vs. local data stores, and comparable reasons.

Spreadsheet applications enable users to process a variety of data types in tabular format, compute formulas, run analyses, create charts, and so on. A typical spreadsheet document may include a table of a relatively large number of rows and columns for the user to fill in. Thus, sizeable amounts of data may be involved with each spreadsheet document. Considering the data may change dynamically, retrieval and update of data for a spreadsheet web service may cause delays in display or interactivity and, thereby, degradation of user experience.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling users to navigate a spreadsheet document presented by a web service in a similar fashion to a locally executed spreadsheet application. As a user navigates a spreadsheet grid or dynamic updates occur, blocks of grid data are retrieved asynchronously in order to display or refresh the area(s) of the spreadsheet currently being viewed by the user.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
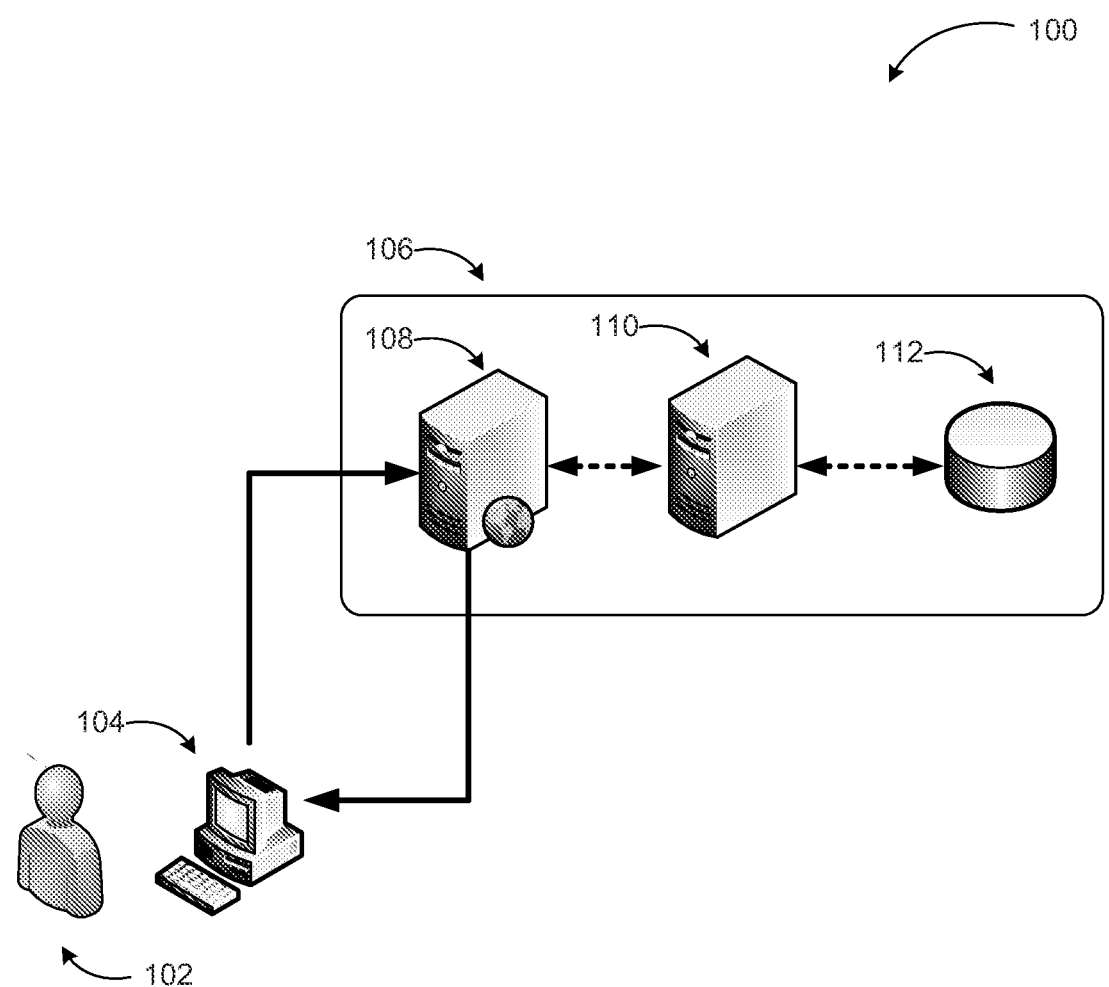
FIG. 1 is a conceptual diagram illustrating an example web accessible spreadsheet service, where embodiments may be implemented.

As briefly described above, users may be enabled to navigate a spreadsheet document presented by a web service in a similar fashion to a locally executed spreadsheet application by retrieving blocks of grid data asynchronously to display or refresh the area(s) of the spreadsheet currently being viewed by the user as the user navigates the spreadsheet grid or dynamic updates occur. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can, for example, be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, the term "platform" may be a combination of software and hardware components for managing web-based spreadsheet service data. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network.

Referring to FIG. 1, conceptual diagram 100 of an example web accessible spreadsheet service, where embodiments may be implemented, is illustrated. In the example system 100 of FIG. 1, web service 106 provides spreadsheet functionality through one or more web applications executed on server 108 for user 102 accessing the system through a generic application such as a browser executed on computing device 104. Server 108 may actually execute the spreadsheet application(s) or provide a front end communicating with backend server 110 to provide the functionality. Data may be stored and provided by data store 112.

To provide a user the experience of a locally executed spreadsheet application when presenting a spreadsheet document through a web service, the user needs to be able to scroll quickly and easily to the extents of a used range (i.e. the portion of the spreadsheet containing data). The user needs further to be enabled to expand the used range of the workbook by continuing to scroll beyond the extents of the used range. This may result in navigation across a large number of rows and columns. Moreover, results from changes to the grid need to be displayed quickly and without disrupting the user's experience.

A service according to embodiments renders the grid of the spreadsheet (rows and columns) in blocks. Every block may be the same size of visible rows and columns, and the blocks may be laid out in the browser's user interface to fill the user's viewport as well as a predefined buffer around the edge of the viewport. The term viewport as used herein refers to one or more areas of a spreadsheet currently being viewed by a user. This is in contrast to the visible contents of a web browser window. A viewport is a predefined area in which the spreadsheet cells are displayed. A viewport may be a small portion of the browser window or it may occupy most of the browser window. The viewport is defined by an application according to embodiments and not controlled by the browser typically. By using the block data mechanism according to embodiments, when the user scrolls, data associated with additional blocks may be sent to the browser as required and blocks removed when the user is no longer looking at them. This allows for the browser to display data that may be located a large number of rows down or columns to the right (or left) in the spreadsheet without having to actually render all cells of the table.

Figure 2:
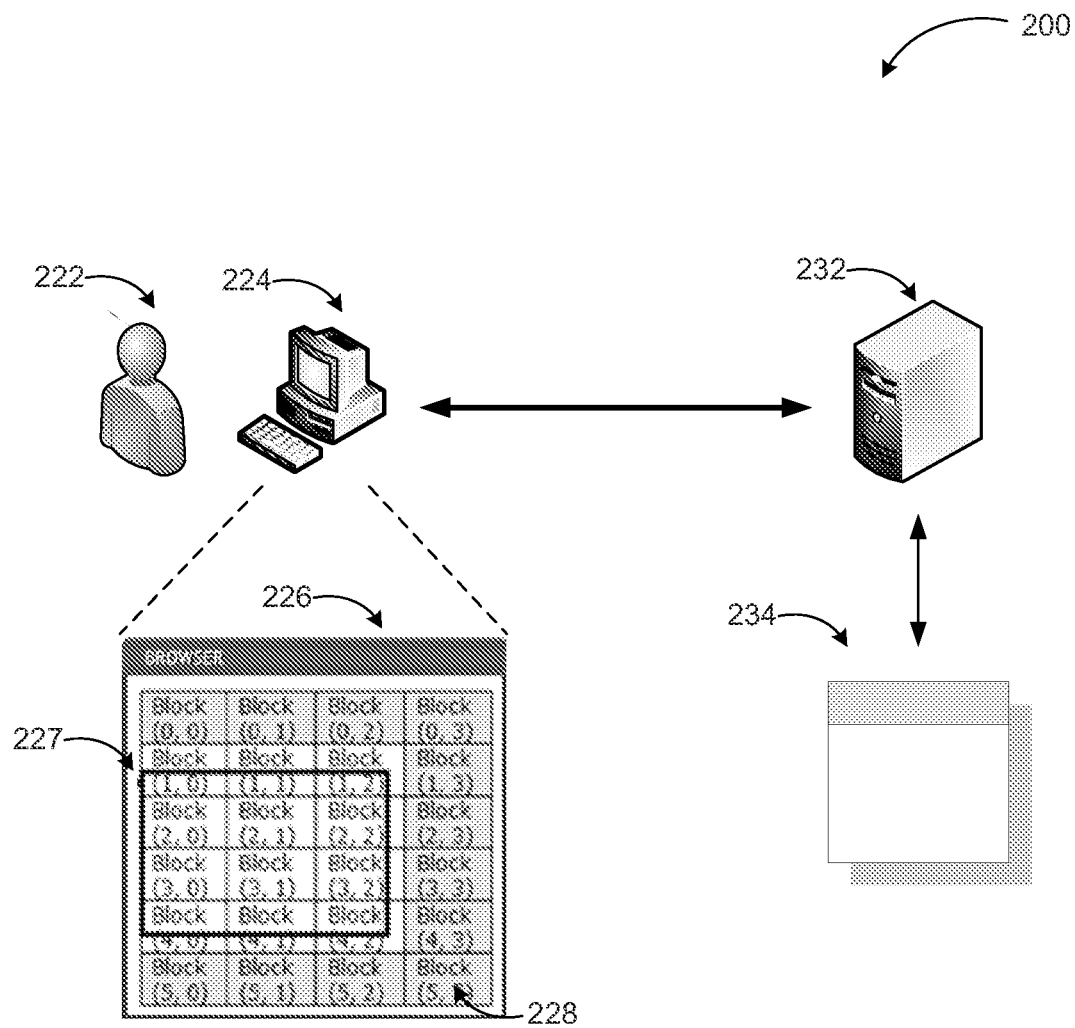
FIG. 2 is another conceptual diagram illustrating display of a spreadsheet processed by a web service application on a user's browser application user interface.

FIG. 2 is another conceptual diagram 200 illustrating display of a spreadsheet processed by a web service application on a user's browser application user interface. Server 232 represents an application server executing a web service providing spreadsheet functionality 234. Application server 232 may be accessed directly or through a front end server (not shown) by browser 226 executed on behalf of user 222 computing device 224.

As mentioned above, the spreadsheet is rendered in blocks (228). A number of blocks provided to the browser and saved locally may be those filling a viewport 227 of the user and a predefined margin around the viewport 227. This way, only a portion of the actual spreadsheet data needs to be forwarded to the browser at any given time increasing efficiency, and reducing resource usage (e.g. memory, network bandwidth, etc.).

Components and actions in diagrams 100 and 200 are for illustration purposes only and do not constitute limitation on embodiments. Other components, software or hardware, and configuration may be employed for providing a web-based spreadsheet service.

Figure 3:
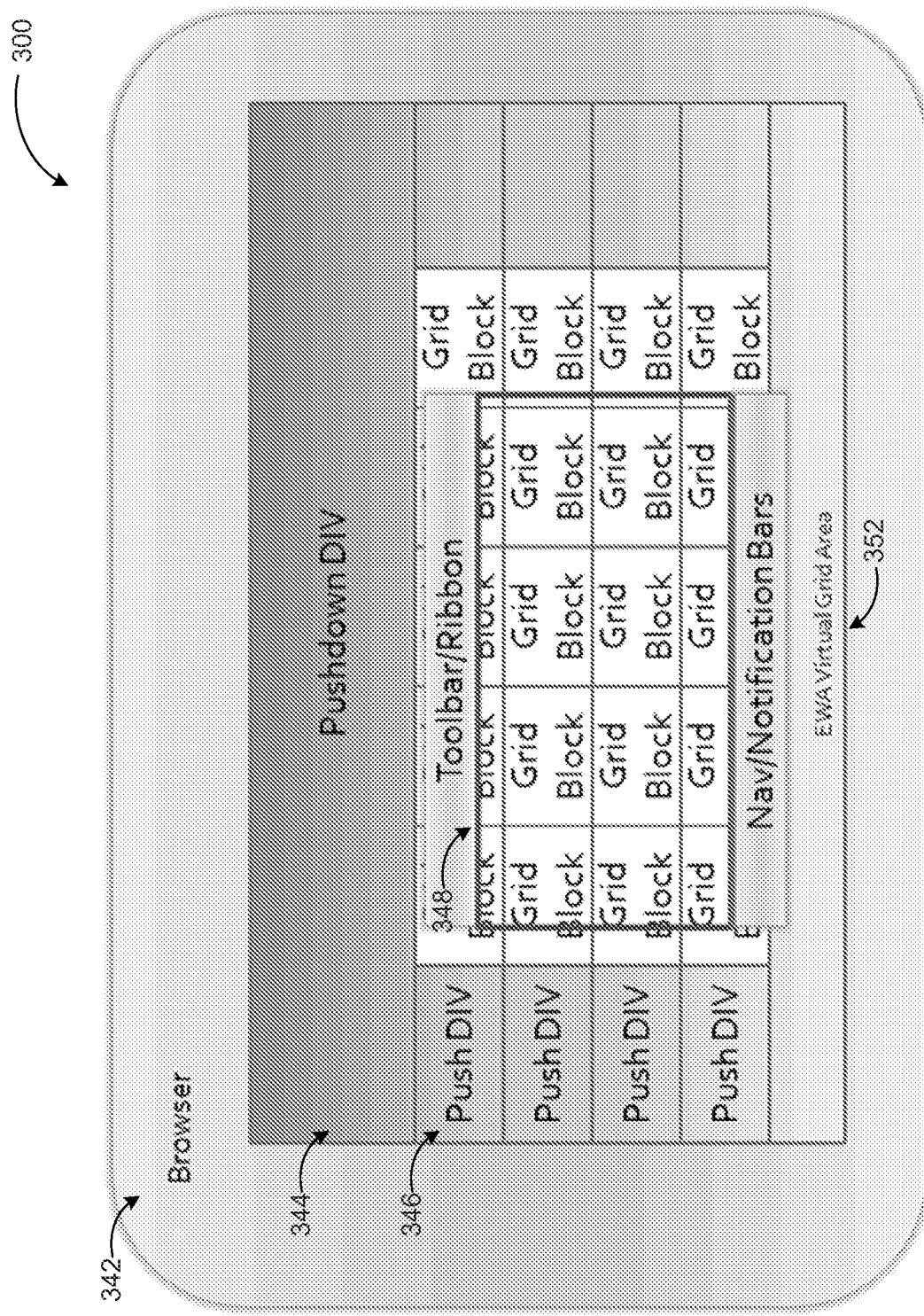
FIG. 3 illustrates positioning of grid blocks on a spreadsheet according to embodiments.

FIG. 3 illustrates positioning of grid blocks on a spreadsheet according to embodiments. To enable navigation of a spreadsheet document presented by a web service in a similar fashion to a locally executed spreadsheet application according to embodiments, the grid 352 is rendered in blocks with every block having the same size of visible rows and columns, although the blocks do not have to be the same size. According to other embodiments, the blocks may be defined different numbers of rows or columns. The blocks may be laid out in the browser 342 to fill the user's viewport 348 as well as some buffer around the edge of the viewport 348.

When the user scrolls, additional blocks are retrieved as required and blocks outside the user's viewport 348 are removed. The blocks may be positioned using 'push divs' 346 and 'pushdown divs' 344 that expand to fill the empty space, as shown in diagram 300. A 'div' is a block element used for creating a container to hold and to position other elements in web-based application user interfaces (e.g. browsers). It is commonly used for absolute positioning of content.

Figure 4:
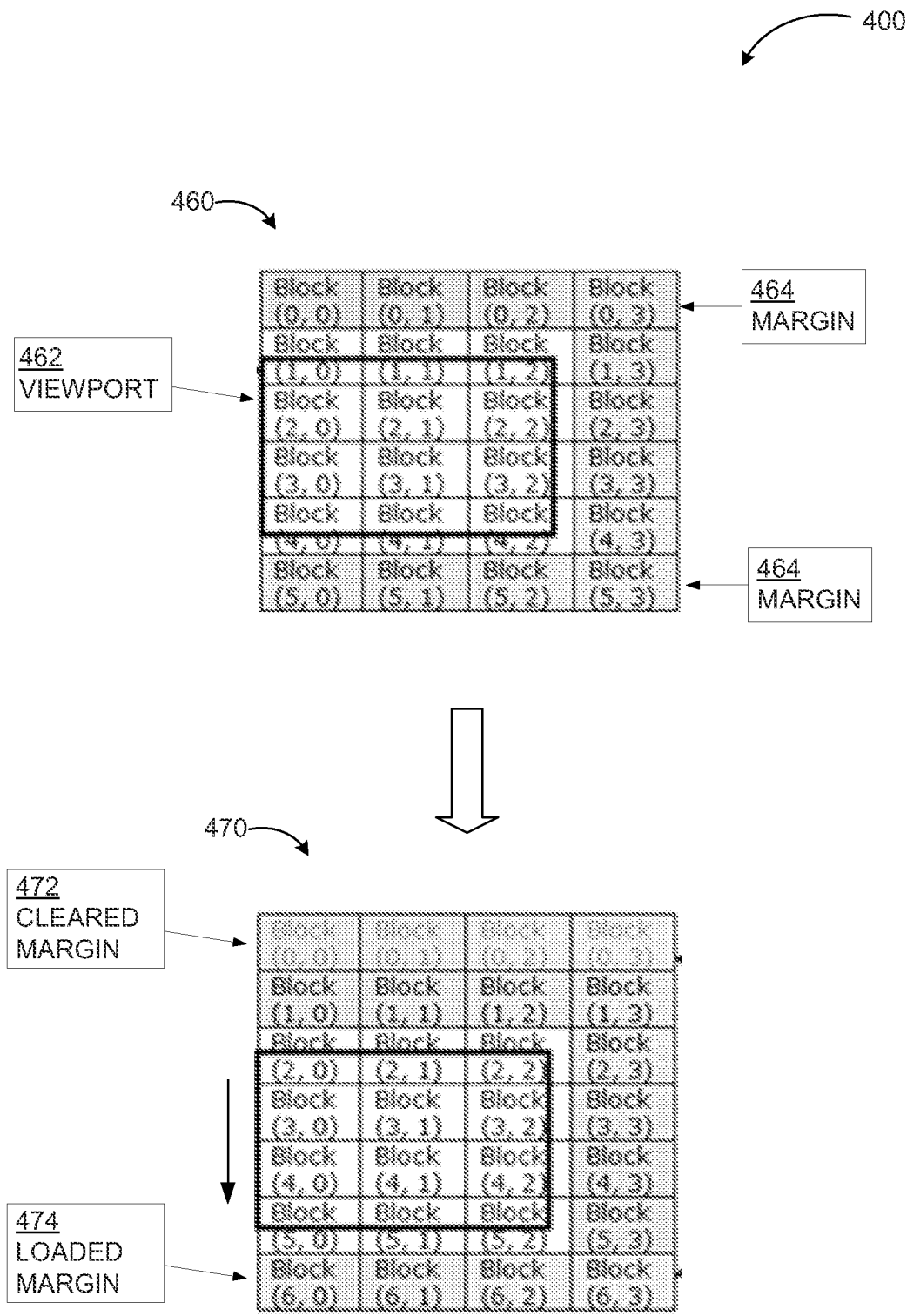
FIG. 4 illustrates scrolling of a grid in a spreadsheet web service according to embodiments and removal/addition of blocks to the local data retrieved from the web service.

FIG. 4 illustrates scrolling of a grid in a spreadsheet web service according to embodiments and removal/addition of blocks to the local data retrieved from the web service. Grid 460 is divided into blocks as discussed above, a portion of which is shown in viewport 462 to the user. Within the complete data grid, viewport 462 is surrounded by margin rows and columns 464.

When the user scrolls, requests may be made to the backend server for the data required for the region that is being looked at (or about to be looked at), as shown in diagram 400. The number of blocks to show in the viewport is estimated and those blocks retrieved from the backend server. Then, additional blocks are retrieved from the backend server based on whether or not the preceding set of block responses actually filled the viewport. Since actual blocks may cover less viewport area than the estimate used for requests (narrow columns width/row heights that the default size), this process repeats until the complete viewport and a predefined margin has been filled. For example, if the viewport 462 is already half full of grid cells, only the blocks for the unfilled region of the viewport may be retrieved. A number of blocks to be stored locally (loaded margin 474) for display may be predefined based on the capabilities of the local system (memory, processing capacity, communication parameters, and similar capabilities). There are two levels of 'cache': in-DOM (displayed in the browser) and browser cache. Both of these may vary separately based on differing parameters for differing improvement in user scrolling experience. When the predefined capacity for holding blocks for the browser is reached, blocks outside the viewport (cleared margin 472) in the opposite direction of the user's scrolling may be removed in order to keep the browser operating quickly.

The scroll speed of the user may also be taken into account. If the user is scrolling quickly, no blocks may be requested until the user stops scrolling or slows down scrolling to a specific threshold. However, updating the row and/or column headers may be continued to give the user an awareness of their location in the workbook. If the user is scrolling slowly, blocks may be continuously requested so that they can continue seeing the data. This feedback mechanism may incorporate either estimated or actual data in order to avoid the network effect.

New data may be retrieved from the backend server by requesting new grid blocks whenever updates are available. This may be accomplished by: (1) submitting a request after the user has entered data; (2) an indication by an adaptive polling mechanism that updates are available to the region of the spreadsheet being viewed by the user; (3) upon resizing the window (making it larger); and (4) updating those cells that need to be updated rather than updating the entire block. The latter mechanism works as follows: if only a few cells need to be updated, the server may only send those updates to the browser, which may render them within the existing blocks. On the other hand, if many cells need to be updated, rendering of the entire block may be requested for efficiency.

It should be noted that updates are only sent to the browser if they affect the viewable range according to some embodiments. Updates made on other parts of the worksheet or on different sheets do not need to cause new grid blocks to be sent to the browser.

Figure 5:
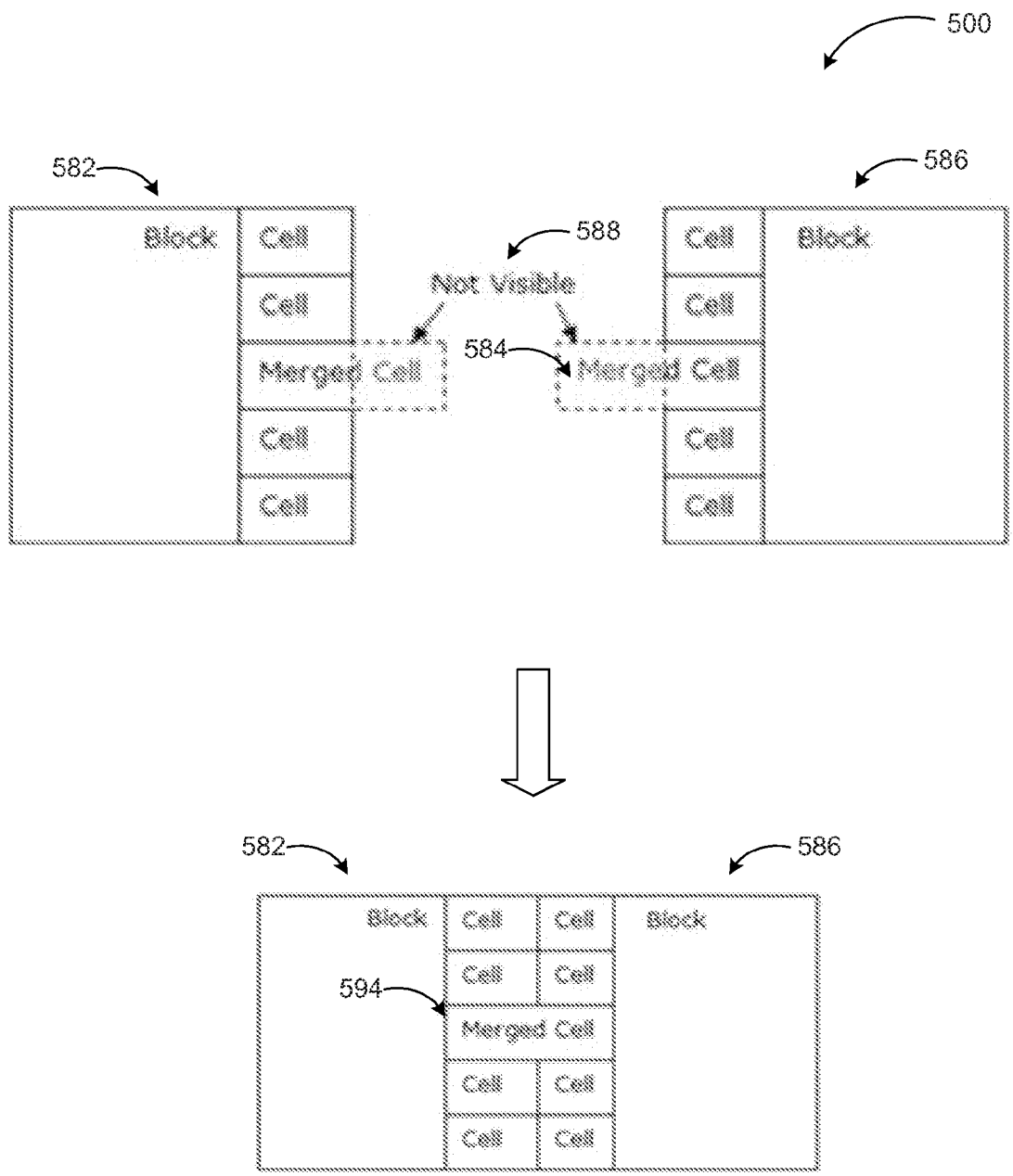
FIG. 5 illustrates rendering of blocks allowing spilling of text or merged cells across blocks in a spreadsheet web service according to embodiments.

FIG. 5 illustrates rendering of blocks allowing spilling of text (i.e. allowing text to spill into adjacent cells or merged cells across blocks) or merged cells across blocks in a spreadsheet web service according to embodiments. According to one embodiment, cells (e.g. cell 588) that need to cross block (582, 586) boundaries may be supported by completely drawing the contents of the cell in each block, and then offsetting the content in the second block. The cell 588 in this case is comprised of two cells. The rightmost part of 588 is then offset negatively by the width of cell 584. That way the content lines up exactly, and it appears to the user as a single string.

According to another embodiment a cell spilling across block boundaries may be positioned above the grid similar to charts and images on the spreadsheet document. This is displayed to the user as if the cell is spilling across the block boundaries, when it is actually a cell positioning on top of both of the blocks.

According to a further embodiment, two columns of cells may be grouped into a single block if one pair among the columns is merged enabling the merged cell to appear within the same block as the cells of its columns prior to the merge.

Such objects include charts, images, and similar objects that need to be able to span across blocks, and they are originally anchored to a visible cell at a reference point (e.g. that their top left corner). Each block has a list of anchors information for each object that intersects the physical area occupied by the block. As blocks are removed, resized, or added, the objects are re-anchored to any remaining block in the set of preceding lists. When no anchors information remains the object is removed. These objects are positioned above the grid, and are thus not affected by the edges of grid blocks. Such objects may be assigned their own 'state id', so that underlying blocks may be updated without the objects needing to be refreshed; that is if the underlying data changed but not the data that affects the objects.

These objects may be removed from the local store (e.g. volatile memory) whenever there are no blocks for them to attach to. Thus, the underlying blocks and objects above those may be removed when the user scrolls these objects out of view.

Because each grid block preferably contains the same number of visible cells according to one embodiment, the backend server may ignore hidden rows or columns and only return visible rows and columns in blocks that are rendered if a requested range includes hidden rows or columns. The fact that there are hidden rows or columns present may be communicated to the browser as well, however, so that the browser can display the correct row and column headers and provide indications to the user as to where the hidden rows or columns are.

In a system according to embodiments, whenever a browser requests blocks, it does not make a request for specific cells (e.g. "cells A1 to T75"). Instead the browser asks for "a block starting at the first visible row and column", etc. If the user scrolls down and to the right, for example, the browser requests "a block starting at the $150^{th}$ visible row and the $30^{th}$ visible column". This allows the browser to remain unaware of which rows/columns are hidden, and for the application server (backend server) to take care of managing the process. The application server meanwhile needs to be able to ignore hidden rows and columns for block requests in order to appropriately service the requests from the browser.

The above discussed user interfaces, scenarios, example systems, applications, and actions are for illustration purposes. Embodiments are not restricted to those examples. Other applications, configurations, and user interfaces may be used in implementing a web-based spreadsheet service using asynchronously retrieved grid blocks in a similar manner using the principles described herein.

Figure 6:
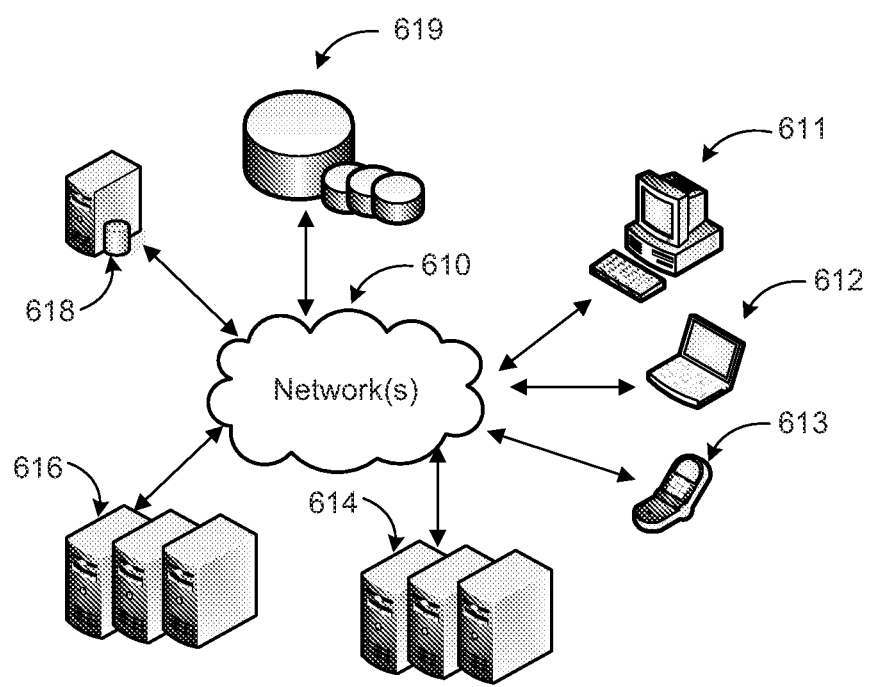
FIG. 6 is a networked environment, where a system according to embodiments may be implemented.

FIG. 6 is an example networked environment, where embodiments may be implemented. A platform providing a web-based spreadsheet service using asynchronously retrieved grid blocks may be implemented via software executed over one or more servers 614 such as a hosted service. The platform may communicate with client applications (e.g. browsers) on individual computing devices such as a smart phone 613, a laptop computer 612, and desktop computer 611 (client devices) through network(s) 610. A web front end service may communicate with spreadsheet services back end executed on a separate group of servers 616.

As discussed above, a browser on client devices 611-613 may be enabled to retrieve spreadsheet data asynchronously as grid blocks and display spreadsheet data in a similar fashion to a user interface of a locally installed and executed spreadsheet application. Information associated with web-based spreadsheet services may be stored in one or more data stores (e.g. data stores 619), which may be managed by any one of the servers 616 or by database server 618.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, data sources, and data distribution systems may be employed to implement a system for a web-based spreadsheet service using asynchronously retrieved grid blocks. Furthermore, the networked environments discussed in FIG. 6 are for illustration purposes only. Embodiments are not limited to the example applications, modules, or processes.

Figure 7:
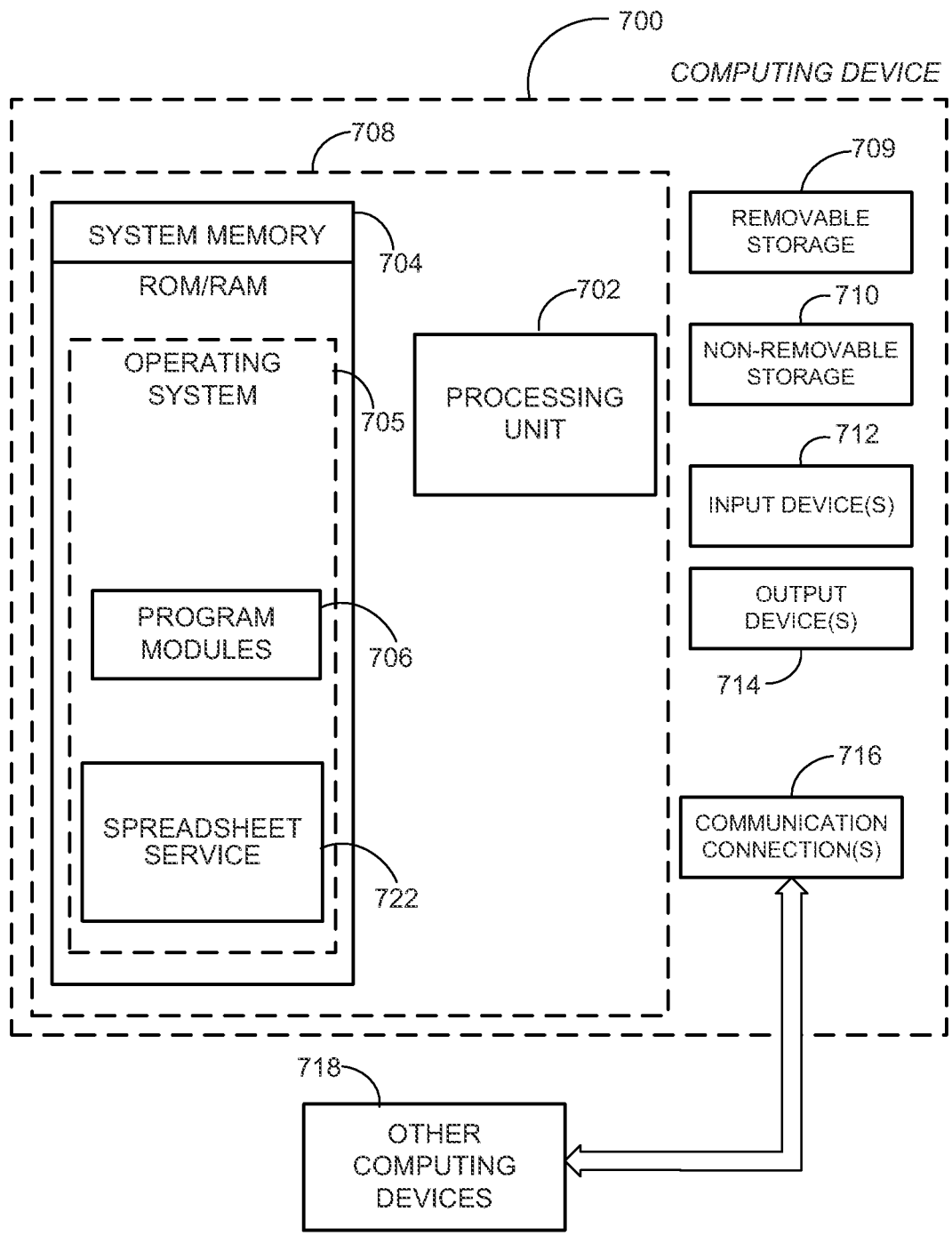
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computing device 700. In a basic configuration, computing device 700 may be a server of a hosted service providing spreadsheet services to client browsers and include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS® operating systems from MICROSOFT CORPORATION of Redmond, Wash. The system memory 704 may also include one or more software applications such as program modules 706 and spreadsheet service 722.

Spreadsheet service 722 may enable users to manipulate, analyze, visualize, and otherwise process data in rows and columns employing asynchronous retrieval of blocks of grid data are retrieved asynchronously in order to display or refresh the area(s) of the spreadsheet currently being viewed by the user as discussed previously. Spreadsheet service 722 may be a separate application or an integral module of a hosted web-based service that provides spreadsheet and other services to client applications/devices. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, and comparable input devices. Output device(s) 714 such as a display, speakers, printer, and other types of output devices may also be included. These devices are well known in the art and need not be discussed at length here.

Computing device 700 may also contain communication connections 716 that allow the device to communicate with other devices 718, such as over a wireless network in a distributed computing environment, a satellite link, a cellular link, and comparable mechanisms. Other devices 718 may include computer device(s) that execute communication applications, host service servers, and comparable devices. Communication connection(s) 716 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
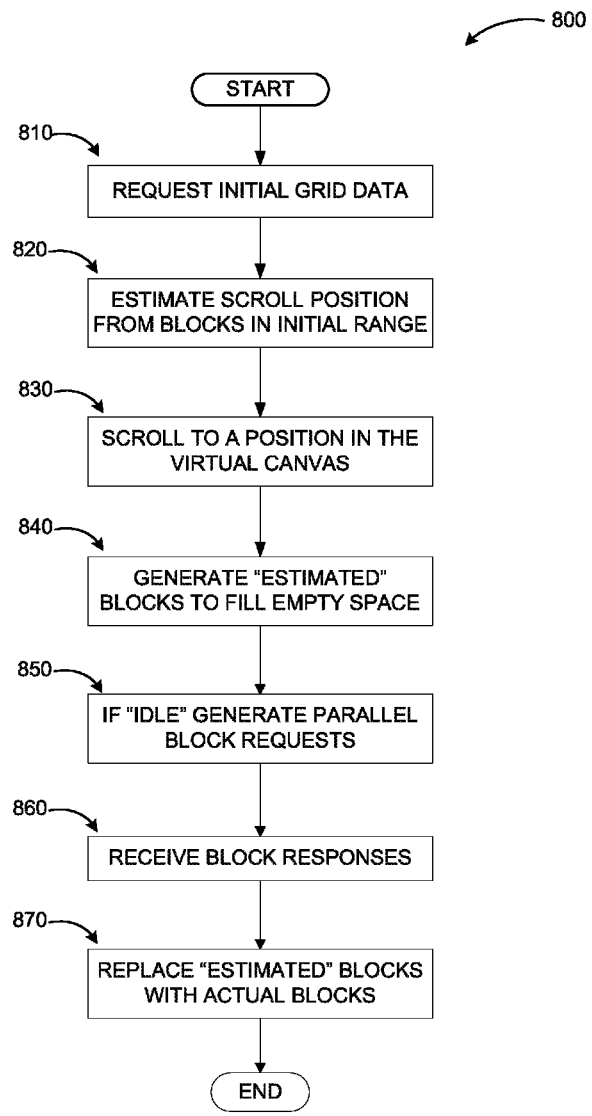
FIG. 8 illustrates a logic flow diagram for a process of providing a spreadsheet grid presentation in a web-based spreadsheet service according to embodiments.

FIG. 8 illustrates a logic flow diagram for process 800 of providing a spreadsheet grid presentation in a web-based spreadsheet service according to embodiments. Process 800 may be implemented as part of a web service as discussed in FIGS. 1 and 2.

Process 800 begins with operation 810, where initial grid data is requested to present the spreadsheet to a user. At operation 820, a scrill position is estimated from blocks that contain the initial selection range. The blocks include those within the viewport of the user and those within a predefined margin. At operation 830, the user scrolls their viewport to a position in the virtual canvas. A settling timer may be set or reset at this time determining whether the user is slowing down or stopping in order to determine which blocks should be requested from the backend server (and which ones should be skipped).

At operation 840, a layout pass generates "estimated" blocks necessary to fill any empty space. Estimated block extents are based on default row/column extents times the number of rows/columns per block. This is followed by operation 850, where parallel block requests are generated to the backend server if an "idle" status is determined (user no longer scrolling). This operation may be performed in response to the scroll timer expiring, an external edit, or a local edit.

At operation 860, block responses are received leading to the replacement of "estimated" blocks with actual blocks from the backend server in the viewport at subsequent operation 870. According to some embodiments, a test may be performed to determine whether the viewport is full and reflects the current revisions. If the viewport is not full or does not reflect the latest revision, processing may return to the layout pass of operation 840. Once the viewport is determined to be full and current, the spreadsheet grid is synchronized.

The operations included in process 800 are for illustration purposes. A web-based spreadsheet service may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for spreadsheet presentation in a web-based spreadsheet service, the method comprising:
   at the web-based spreadsheet service, receiving a request for rendering a spreadsheet on a viewport associated with a browsing application, wherein the spreadsheet is divided into blocks of cells, a portion of which forms currently viewed data from the web-based spreadsheet service, wherein the viewport includes a predefined area of a user interface defined by the browsing application where the spreadsheet is displayed and wherein the portion of the blocks of cells is encompassed by the viewport and a predefined buffer margin around an edge of the viewport;
   determining the portion of the blocks of data forming the currently viewed data from the web-based spreadsheet service to be forwarded to the browsing application based on a number of cells encompassed by the viewport and a predefined margin around the viewport;
   forwarding the determined portion of the blocks of data to the browsing application to be rendered and saved locally at the browsing application;
   determining a need to update at least a portion of the rendered spreadsheet data based on a scrolling action on the rendered spreadsheet at the browsing application;
   setting a timer to determine a scrolling speed of the scrolling action on the rendered spreadsheet;
   estimating a number of blocks of data to show in the viewport based on the scrolling action in response to the update;
   asynchronously forwarding the estimated blocks of data in response to the update;
   performing a test to determine if the estimated blocks of data fill the viewport;
   if the estimated blocks do not fill the viewport, asynchronously retrieving additional blocks of data from the backend server for rendering in the viewport; and
   removing blocks of data outside the viewport.

2. The method of claim 1, wherein each data block comprises the same number of rows and columns, and wherein the data blocks are laid out such that the data blocks fill the viewport and the predefined margin around the viewport.

3. The method of claim 1, wherein a size of the predefined margin is determined based on at least one from a set of: a memory of the computing device, a processing capacity of the computing device, and a communication capacity between the browsing application and a server executing the web-based spreadsheet service.

4. The method of claim 1, wherein the data blocks to be forwarded to the browsing application are determined based on the scrolling speed.

5. The method of claim 4, further comprising:
   if the scrolling speed is less than a predefined threshold, continuing to forward data blocks encompassed by the viewport; and
   if the scrolling speed is more than a predefined threshold, skipping blocks until the scrolling speed slows to a value below the predefined threshold.

6. The method of claim 5, further comprising:
   if data blocks are skipped based on the scrolling speed, continuing to forward row and column headers to the browsing application to provide a user an awareness of their location within the spreadsheet.

7. The method of claim 5, further comprising:
   generating one or more push div block elements for creating a container to fill empty space associated with the data blocks that are skipped based on the scrolling speed for immediate feedback based on default row and column extents multiplied by a number of rows and columns per block; and
   replacing the one or more push div block elements with actual data blocks upon receiving an update from the server executing the web service.

8. The method of claim 1, wherein the need for the update is determined based on one of: a request from the browsing application upon user entry of new data, an indication from an adaptive polling mechanism that updates are available to a region of the spreadsheet being viewed, and receiving an indication of resizing of the user interface of the browsing application displaying the rendered spreadsheet.

9. The method of claim 1, wherein the data blocks are positioned vertically and horizontally in relation to a scroll position within the rendered spreadsheet, and wherein the updates to data blocks outside the viewport and the predefined margin are not forwarded to the browsing application by the server executing the web-based spreadsheet service.

10. The method of claim 1, wherein intermediate versions of changes to the spreadsheet are skipped from being forwarded to the server executing the web-based spreadsheet service if the changes occur in succession.

11. A system for executing a spreadsheet service, the system comprising:
    a web front end (WFE) server configured to:
      in response to receiving a request for rendering a spreadsheet, forward the request to a backend server, wherein the request includes a portion of data blocks which form currently viewed data from the web-based spreadsheet service to cover a viewing area of a user on a browser user interface (UI) and predefined margins around the viewing area;
      determine a set of data blocks to be skipped based on detecting the user's scrolling speed on the rendered spreadsheet;
      one of set and reset a timer to determine whether the user is one of slowing down and stopping;
      determine blocks to be requested from the backend server based on the timer;
      receive requested portion of the data blocks including portions of the currently viewed data from the web-based spreadsheet service from the backend server;
      provide the portion of the data blocks to the browser for rendering;
      generate estimated data blocks including one or more push div block elements for creating a container to fill empty space associated with the data blocks that are skipped based on the user's scrolling speed for immediate feedback based on default row and column extents multiplied by a number of rows and columns per block;
      replace the estimated data blocks including the one or more push div block elements with actual data blocks upon receiving an update from the backend server;
      determine if the replaced data blocks fill the viewport; and
      if the replaced data blocks do not fill the viewport, retrieve additional data blocks from the backend server for rendering in the viewport;
    the backend server configured to execute a spreadsheet application, wherein the backend server is arranged to:
      asynchronously retrieve and forward the portion of the requested blocks of data to the WFE server, wherein header information associated with the rows and columns of the skipped data blocks are provided to the user's browser; and update and asynchronously forward the portion of the requested data blocks in response to an update based on one of: a request from the browser upon user entry of new data, an indication from an adaptive polling mechanism that updates are available to a region of the spreadsheet being viewed by the user, and an indication of resizing of a user interface of the browser displaying the rendered spreadsheet.

12. The system of claim 11, wherein the requested data blocks are determined based on a comparison of the user's scrolling speed to a predefined threshold.

13. The system of claim 11, wherein the backend server is further configured to adjust block boundaries for a cell exceeding a block boundary by completely drawing contents of the cell and offsetting the content in an adjacent block by a width of the cell.

14. The system of claim 11, wherein the backend server is further configured to position a cell exceeding a block boundary such that the cell is rendered by the browser as spilling over the block boundary while the cell is positioned over two adjacent blocks.

15. The system of claim 11, wherein the backend server is further configured to group two columns of cells into a single block upon merging of a pair of cells on each column.

16. A computer-readable memory device with instructions stored thereon for providing a web-based spreadsheet service, the instructions comprising:

receiving a request for a set of data blocks forming currently viewed data from the web-based spreadsheet service to render a spreadsheet on a user's browser to increase efficiency and to reduce resource usage, and are determined based on a number of cells encompassed by the user's viewport and a predefined margin around the viewport;

determining another set of data blocks to be skipped based on detecting the user's scrolling speed on the rendered spreadsheet;

providing the portion of the requested set of data blocks forming the currently viewed data from the web-based spreadsheet service and row and column headers associated with the skipped other set of data blocks to the user's browser;

generating estimated data blocks including one or more push div block elements for creating a container to fill empty space associated with the data blocks that are skipped based on the user's scrolling speed for immediate feedback based on default row and column extents multiplied by a number of rows and columns per block;

determining a need to update at least a portion of the rendered spreadsheet data wherein the update is limited to changes affecting data presented on the viewport and changes affecting other parts of the web-based spreadsheet do not cause new data blocks to be sent;

replacing the estimated data blocks including the one or more push div block elements with actual data blocks upon receiving an update from a backend server executing the web-based spreadsheet service;

determining if the replaced data blocks fill the viewport;

if the replaced data blocks do not fill the viewport, retrieve additional data blocks from the backend server for rendering in the viewport;

forwarding to the user's browser updated blocks of data corresponding to an overlap of the at least one portion of the spreadsheet and the user's viewport; and removing blocks of data outside the user's viewport from a local store associated with the browser where the blocks of data are rendered.

17. The computer-readable memory device of claim 16, wherein the instructions further comprise:

removing an object anchored to a cell on the spreadsheet and position over the cell in response to one of: receiving a delete action for the cell anchoring the object and the cell anchoring the object no longer being within the user's viewport.

18. The computer-readable memory device of claim 17, wherein the object includes at least one from a set of: a chart, an image, a graphical object, and a textual object.

19. The computer-readable memory device of claim 16, wherein the requested set of data blocks is also determined based on a width of columns within each data block and a height of rows within each data block.

* * * * *